No. 736,476. PATENTED AUG. 18, 1903.
W. BAXTER, Jr.
ELECTRICALLY CONTROLLING MOTORS FROM A DISTANCE.
APPLICATION FILED APR. 24, 1901.
NO MODEL. 3 SHEETS—SHEET 1.
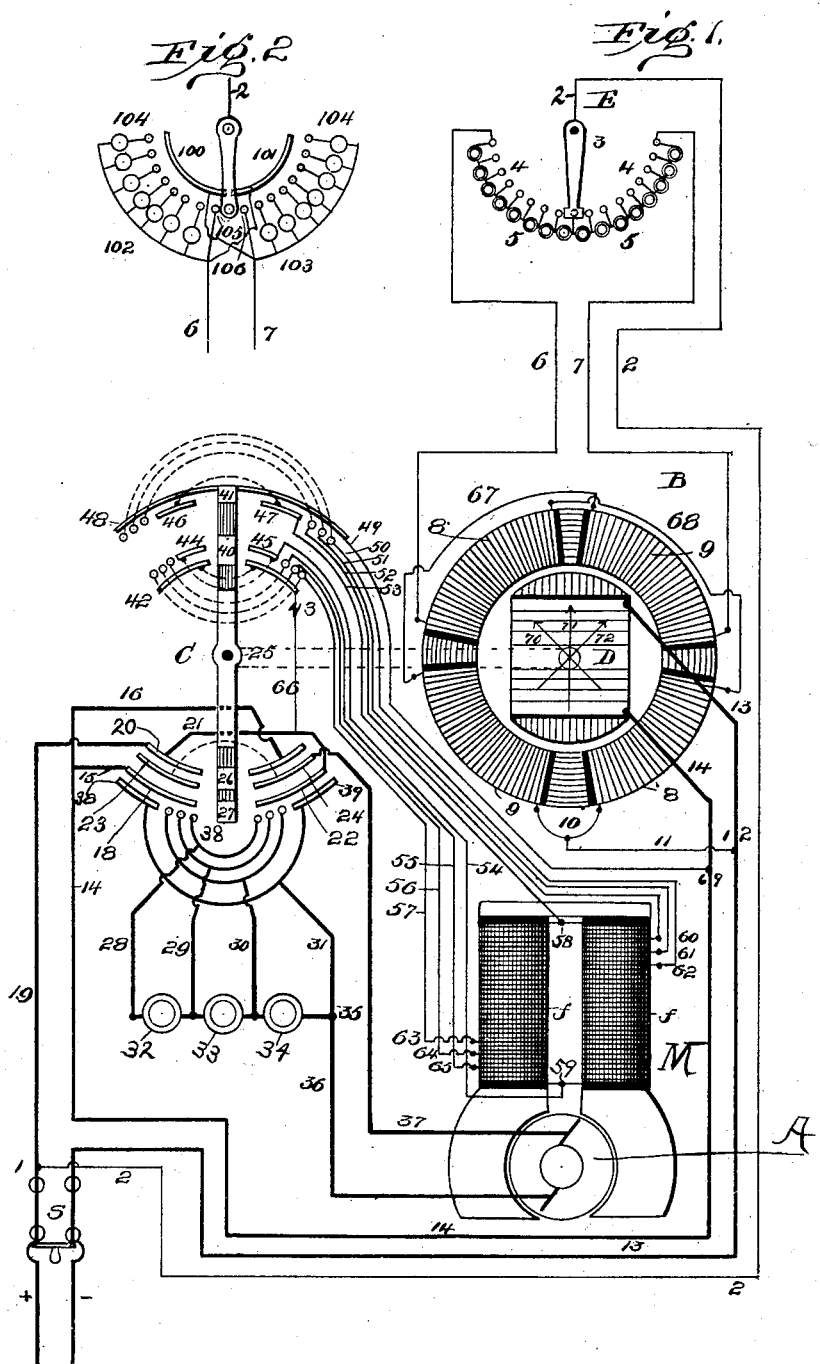
Witnesses:
J. M. Fowler
Harry A. Knight
Inventor
Wm. Baxter Jr.
By Knight Bros
Attys No. 736,476. PATENTED AUG. 18, 1903.
W. BAXTER, Jr.
ELECTRICALLY CONTROLLING MOTORS FROM A DISTANCE.
APPLICATION FILED APR. 24, 1901.
NO MODEL. 3 SHEETS—SHEET 2.
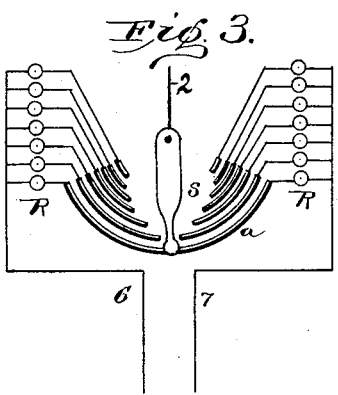
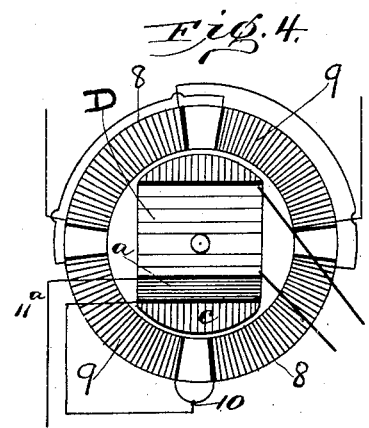
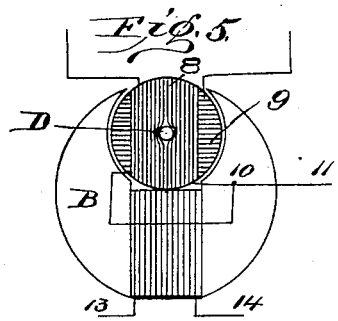
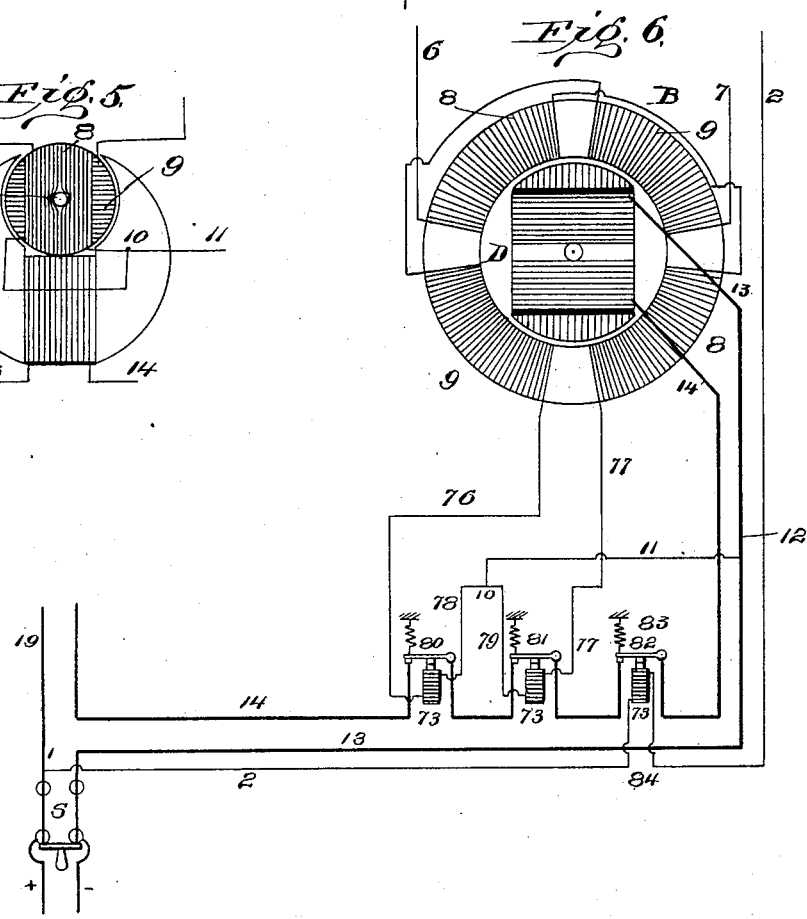
Witnesses:
J. M. Fowler Jr
Harry A. Knight
Inventor.
Wm. Baxter Jr
By Knight Bro
Attys No. 736,476. PATENTED AUG. 18, 1903.
W. BAXTER, Jr.
ELECTRICALLY CONTROLLING MOTORS FROM A DISTANCE.
APPLICATION FILED APR. 24, 1901.
NO MODEL. 3 SHEETS—SHEET 3.
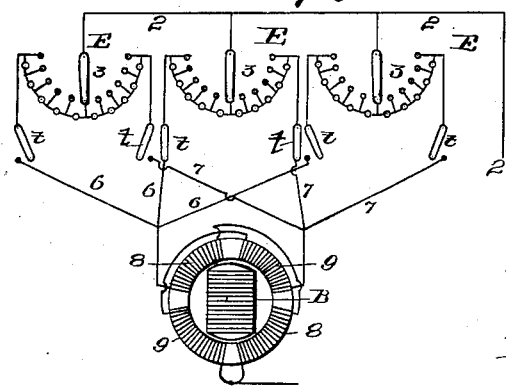
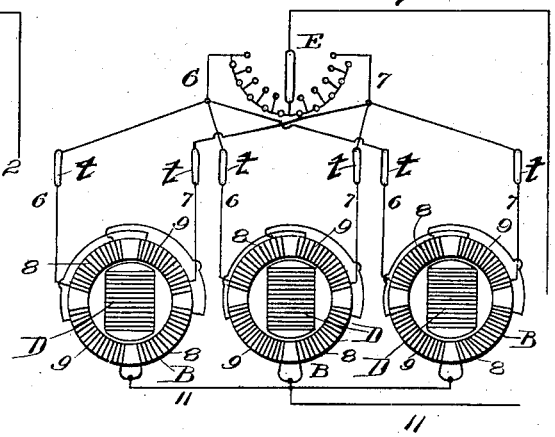
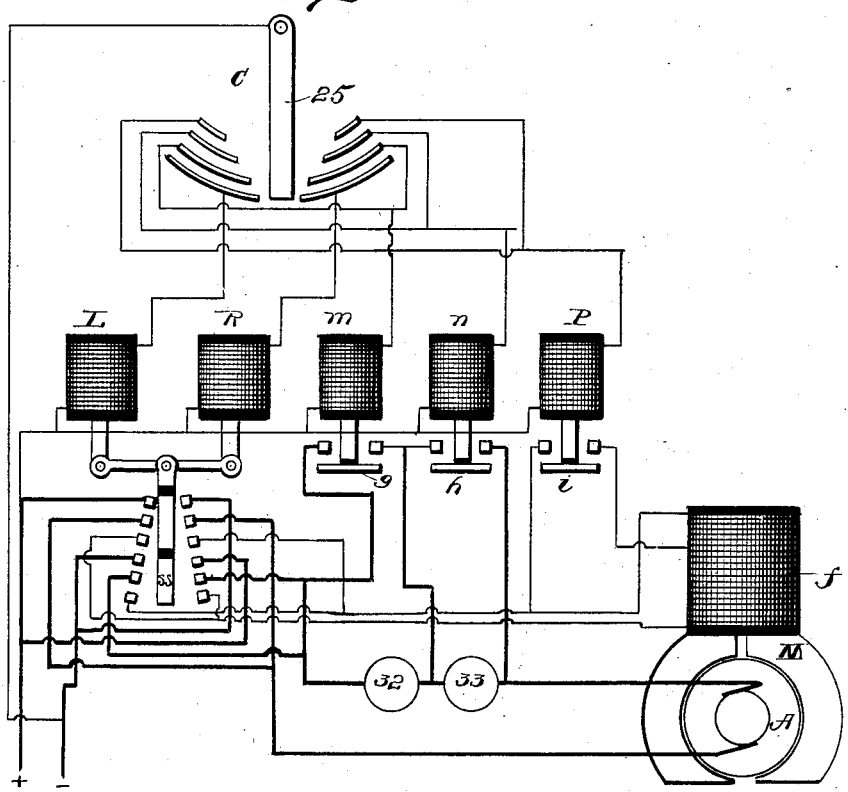

No. 736,476.                                          Patented August 18, 1903.

UNITED STATES PATENT OFFICE.

WILLIAM BAXTER, JR., OF JERSEY CITY, NEW JERSEY.

ELECTRICALLY CONTROLLING MOTORS FROM A DISTANCE.

SPECIFICATION forming part of Letters Patent No. 736,476, dated August 18, 1903.

Application filed April 24, 1901. Serial No. 57,166. (No model.)

*To all whom it may concern:*

Be it known that I, WILLIAM BAXTER, Jr., a citizen of the United States, and a resident of Jersey City, in the county of Hudson and State of New Jersey, have invented certain new and useful Improvements in Electrically Imparting and Controlling Motion from a Distance, of which the following is a full, clear, and exact description.
This invention relates in general to a system of electrically imparting to a distant mechanism a desired certain and definite form or degree of motion. More specifically, the invention relates to the adaptation of the aforesaid general idea to controlling electric motors from a point distant from the controller that regulates the supply of current to the motor. The general idea is fully illustrated in the particular use to which I have herein adapted the invention.

In carrying out the specific form of the invention I employ a motor-controller comprising switches, rheostats, &c., adapted to stop, start, reverse, and vary the speed of the motor, an electromagnetic device, which I call the "controller-mover," for operating the controller, and an operating-switch for controlling the action of the controller-mover. The motor-controller will generally be referred to as the "controller," while the switch which controls the action of the controller-mover will be called the "operating-switch."

This invention may be used wherever a controller or controlling device—whether an electric, a hydraulic, a pneumatic, or a mechanical controller, or of whatever type or for whatever purpose—is located at a distance from the point from which its motion is to be controlled. In some such cases the position of the controller and the location of the operating-switch are fixed—as, for example, in hoisting-machines used on docks, where the hoister is stationary at one point and the operator is likewise stationary at another point. In other cases the operating-point is stationary, while the controller moves—as, for example, where the motor is mounted upon a car that runs back and forth on a swinging crane or bridge. In still other cases the controller is stationary, while the point from which it is controlled moves—as, for example, in passenger and freight elevators, in which the elevator-machine is stationary in some convenient position in the building, while the elevator-car, which is the point of control, moves up and down the elevator-well. In all these cases the controller and the controller-mover are placed on or near the motor, while the operating-switch is placed at the point from which the motor is controlled. In order that the action of the controller-mover may be controlled by the operating-switch, it is necessary that the two be electrically connected with each other. Hence circuit-wires are run from the operating-switch to the controller-mover.

The operation of my invention will be clearly understood upon reference to the accompanying drawings, in which—

Figure 1 illustrates the system complete. Figs. 2 and 3 show modifications of a portion of the operating-switch. Figs. 4 and 5 show modifications of a portion of the controller-mover. Fig. 6 shows certain safety appliances which are intended to come in action in the event of certain disarrangements of the circuit connections between the operating-switch and the controller-mover. Fig. 7 shows a plurality of operating-switches through which the controller-mover may be controlled from any one of a number of points. Fig. 8 shows diagrammatically an arrangement by which a single operating-switch may be made to control a plurality of controller-movers. Fig. 9 is a diagram of an arrangement by which the motor-controller produces the circuit changes in the motors through the medium of a number of independent switches.

In Fig. 1, M represents a shunt-wound motor, $ff$ being the shunt field-coils, and A the armature. C represents the controller, and B the controller-mover, mounted on the same shaft or suitably-connected shafts. E is the operating-switch, and 6 and 7 are wires forming the circuit connections between said operating-switch and the controller-mover B.

The controller C is represented in such a form as to be capable of reversing the direction of rotation of the motor, as well as to vary its velocity. It is evident, however, that this very controller can be used with a motor that is not to be reversed by simply turning the switch-lever 25 in one direction only. In other words, one-half of the controller-contacts, together with the lever 25, constitute a unidirectional controller. As the invention is applicable to non-reversible as well as reversible motors, I do not restrict its use to a single type, and, as clearly shown in the drawings, it is adapted to either type of motor without modification, although in practice for a unidirectional motor the controller would be simplified by omitting the unnecessary contacts.

When the lever 25 is turned, say, in the direction in which the hands of a clock move, its bridging contacts 26 and 27, which are insulated from each other and from surrounding objects, form electrical connections between the terminals 20 and 23 through contact 26 and also between 18 and the first of the three terminals in the line 38 through contact 27. With these connections if the circuit is complete up to wires 14 and 19 the current 19 will pass to terminal 20 and thence through 26 to 23 and through the dotted connection will reach terminal 24 and then wire 37, which leads to one of the armature-terminals. Returning from the armature through wire 36 the current will pass through the three resistances 34, 33, and 32 and reach wire 28, which is connected with the first small terminal in the line 38. From this terminal, through the bridging contact 27, the circuit is closed with terminal 18, which is connected through the branch 15 with wire 14. Thus the circuit through the motor-armature is closed with the three resistances 32, 33, and 34 in series. From the connection 21 a current is shunted through wire 66 to terminal 43, and this terminal is connected with 45 through the insulated bridging contact 40 of lever 25. From terminal 45 the current flows through wire 54 to the junction 59 of the shunt-coil terminals, and after passing through the coils $ff$ in parallel branches reaches junction 58 and thence passes through wire 53 to controller-terminal 47, which is connected with 48 by means of the insulated bridging contact 41, mounted on lever 25. From terminal 48 the current flows through wire 49 to junction 69 on wire 14, thus completing the shunt-circuit between 19 and 14. If the controller-lever 25 is left in this position, the speed of the motor will be slow, because the armature-current will have to pass through the resistances 32 33 34, which will absorb a considerable portion of the electromotive force of the operating-current. If lever 25 is advanced far enough to bring contact 27 over the second terminal in line 38, the resistance 32 will be cut out of the armature-circuit, the current passing through wire 29 instead of through wire 28, and while the lever is in this position the speed of the motor will be higher than when the lever was in the first position. If lever 25 is advanced to a position where contact 27 covers the third terminal in line 38, resistance 33 will be cut out of the armature-circuit, the current passing through wire 30. In this third position of lever 25 the speed will be greater than when the lever was in either of the two preceding positions, as less resistance is left in the armature-circuit. If lever 25 is advanced to the fourth position, contact 27 will cover the elongated end terminal in line 38. Then the current will flow through wire 36 to 31, and thus cut out all the resistance in the armature-circuit, and thereby further increase the speed of the motor being controlled. These four positions of lever 25 will give four different speeds of the motor-armature. To further increase the speed, it is necessary to either reduce the field magnetism or reduce the number of effective conductors upon the armature. In the arrangement shown in the drawings the field magnetism is reduced to obtain higher speeds. As will be seen, the field shunt-coils $ff$ are connected in parallel, the wire being so wound that if the current passes in at junction 59 and out at 58 all the turns in both coils will act to magnetize the field or will be positive turns. If the current enters at 65 and passes out at 60, then through the turns between 65 and 59, and between 60 and 58, the currents will flow in the opposite direction, thus converting these into negative turns. If the current enters at 64 and passes out at 61, the number of negative turns will be doubled, and if the current enters at 63 and passes out at 62 the number of negative turns will be three times as great. Thus by changing the point of entry of the current from 59 to 65, 64, and 63 four different strengths of field magnetism can be obtained, and therefore four armature speeds. It will be seen from the upper portion of controller C that if lever 25 is advanced beyond the fourth position that at the fifth position, while maintaining the connection through its lower end, its upper contact 40 will connect 43 with the first small terminal in line 45, while its contact 41 will connect terminal 48 with the first small terminal in the line 47, and thus cause the current to enter the field-coils through 65 and pass out through 60. In the sixth position of 25, 43 is connected with the second terminal in the line 47, and 48 is connected with the second terminal in the line 47, thus admitting the current to the field-coils through 64 and out through 61. In the same way the seventh position of 25 sends the current through the field-coils from 63 to 62, thus developing the weakest field and giving the highest speed.

In order that the controller C may operate most satisfactorily, it is desirable that it be moved to fixed points for the several speeds. These points are commonly called "steps," and the controller that is moved as shown in the drawings is said to have "seven steps." If the lever 25 does not move to the exact position, it may not make perfect contact with all the stationary terminals, and thus permit "arcs" to be formed, which will soon destroy the parts. Controllers of the type shown at C are commonly used with motors in cases where the operator stands near the controller and moves the lever 25 by means of a crank or lever attached to the stud around which 25 swings. The controllers used with electric-railway cars are of this general principle, although not of similar construction, the lever 25 being generally replaced by a cylinder and the stationary terminals being somewhat modified, a crank on the shaft upon which the cylinder is mounted being turned to bring the cylinder to the several steps. To insure moving the cylinder to the proper position at each step, marks are placed on the top cover of the controller, and a pointer is attached to the crank-handle. When the pointer comes opposite a mark, the cylinder is in the proper position for the step represented by the mark. To further insure moving the cylinder to the proper positions, a cam-wheel is generally attached to the cylinder-shaft, and this has depressions corresponding to the several steps. A roller is mounted at one side of the cam and is pressed against it by a spring, so that when the motorman turns the crank-handle he can feel when the roller drops into a depression, and thus know that the cylinder is in the proper position without looking at the top dial. In like manner to be able to use a controller such as C and operate it from a distant point satisfactorily it is desirable to provide means whereby lever 25 may be moved positively and with precision from step to step and not be liable to be moved a step and a fraction more or fall short of moving a full step. It is further desirable that the operator at the distant point may know to what step controller C has been moved.

The object of this invention is to provide electrically-actuated means for effecting this positive movement of lever 25 that will avoid the necessity for conveying the whole working current to and from the point of control, which would involve the use of heavy cables leading to and from said point and a large controller at said point, a small current derived from the main current being transmitted to such point in a unidirectional constantly-closed parallel circuit of small conductors, and there distributed to the controller-movers by a small switch, thus necessitating but three small wires through which to effect entire control of the apparatus.

The controller-mover B can be mounted upon the same shaft with lever 25, as suggested by dotted lines in Fig. 1, or it can be arranged to impart motion to the latter through any gearing that is positive and does not permit slipping. For the purpose of the present illustration we will assume that the armature D of mover B is mounted upon the same shaft as the lever 25.

The outer ring of mover B is a field-magnet and is magnetized by two sets of coils 8 8 and 9 9. The coils 9 9 acting alone will develop a magnetic flux that will cross the central space in the direction of arrow 70, and coils 8 8 acting alone will develop magnetic lines of force that will cross the central space in the direction of arrow 72. If the coils 9 9 and 8 8 have the same number of turns and are traversed by currents of equal strength, their magnetizing forces will be equal, and as a result if both act at the same time the actual field will be the resultant of these two magnetizations and will be in the direction of arrow 71. If the current flowing through the coils 9 9 is stronger than that flowing through the coils 8 8, the resultant field will be in a direction somewhere between arrows 70 and 71. If the stronger current flows in the coils 8 8, the direction of the resultant field will be between arrows 71 and 72. From these facts it follows that by increasing the current in one or the other set of field-coils the direction of the magnetic field can be caused to swing around from a position nearly in line with arrow 70 to a position nearly in line with arrow 72.

The field-ring consists of an iron core upon which the coils 9 9 and 8 8 are wound. The armature D is made of iron, and as the air-gaps between its pole-faces and the core of the field-ring are shorter than the distance between the sides of the core and the field it will be drawn into a position parallel with the field-magnet's lines of force. Hence to be able to move D to any desired position all that is necessary is to provide means whereby the currents flowing through the coils 8 8 and 9 9 may be proportioned so as to swing the field magnetization into that position.

The operating-switch E provides a means for accomplishing the above purpose. In this switch resistances (shown at 5) are connected in series, and from their junctions connections are run to the terminals 4. If the switch-lever 3 is in the central position, as shown, it will divide the resistance equally, so that if a current is supplied through wire 2 it will divide equally on passing from 3 through the resistances 5 5, and thus the currents flowing through the wires 6 and 7 to the two sets of field-coils 8 8 and 9 9 will be equal, and as a result the field magnetization will be in the direction of arrow 71. If lever 3 is turned toward the left, resistance will be cut out of wire-6 circuit and will be added to the wire-7 circuit. Hence the current through coils 8 8 will be increased and that through coils 9 9 will be decreased, thus causing the field's magnetic lines of force to swing around in the direction of arrow 72. If lever 3 is moved toward the right, the magnet-flux will be swung in the opposite direction—that is, toward arrow 70. It is evident that to swing the field-flux of mover B to any position between arrows 70 and 71 or between 71 and 72 all that is necessary is to properly proportion the resistances 5 5. It is further evident that if with a given difference of potential between the lever 3 and the junction 10 the field-flux is swung into a certain position for a given position of lever 3, it will ever after swing to the same position when lever 3 is moved to the corresponding position.

Although the armature D will be carried around by the magnetism of the field, the rotative force or torque developed may not be sufficient to move a large controller. Therefore for the purpose of increasing this torque a coil is wound upon D, and this is connected with the main circuit, or may be included in the armature-circuit, as is shown by the wires 13 and 14.

The current for magnetizing the field of mover B can be shunted from the main line or it can be obtained from a separate source, such as a storage battery. In Fig. 1 the current is derived from the main line.

Operation: When the main switch S is closed, the current passes at point 1 to wire 2 and thence through the operating-switch E and the wires 6 7 to the field-coils of B and to junction 10, thence through wire 11 to junction 12 on wire 13, and thence back to the opposite side of the main line. If the lever 3 is in the central position, D will remain with its poles in the line 71, as shown. If arm 3 is moved to the first terminal to the right, D will swing to the first position to the left—that is, through one step. When D is in the central position, the circuit through the coil wound thereon is opened, because lever 25 is in the central position and there is no connection between wire 14 and 19. C, however, can move with little resistance through the first step, as it is only retarded by the shaft friction. Hence the torque developed by the attraction of the field flux upon the iron core of D will be sufficient to produce the movement through the first step. When this step is made, the lever 25 closes the circuit between wires 14 and 19 through the motor-armature, and then all the current that passes through the motor-armature will also pass through the coil wound on D, and thus give it a definite inherent polarity and greatly increase its torque. If now the lever 3 is moved to the second, third, fourth, &c., terminals, the armature D will be carried around to corresponding positions by the shifting field flux of B. If lever 3 is carried around to the last terminal, D will likewise be carried around to the last step, and if 3 is now moved back to the central position D will follow its movement. Thus it will be seen that through the operating-switch E and the controller-mover B means are provided for effecting a positive movement of the controller-lever 25 from step to step either to increase or decrease the speed of the motor, and the movement is at least as positive as if the lever 25 were actually moved by the hand of the operator, and this result is obtained without passing to and through the operating-switch of the current that actuates the controller-mover or the motor. The control should be more positive, because the lever 3 can be made small, so as to move very freely and be moved with precision, while the lever 25, being large and moving with considerable resistance, can when moved by hand be carried beyond the mark occasionally on account of a sudden increase or decrease in the resistance to motion.

In Fig. 1 the resistances in operating-switch E are shown connected in series, but this is not essential, as any connection will meet the requirements providing it is such that the movement of lever 3 will increase the resistance in one of the circuits of wires 6 or 7 or reduce it or increase it in one while reducing it in the other.

*Modified operating-switches.*—Fig. 2 shows a way in which the resistances can be arranged so that when switch-arm 3 is in the central position there is no resistance in either circuit, but if 3 is moved to the right the current passes directly from terminal 101 to wire 6, while to reach wire 7 it must pass through one of the resistances 104. By making these resistances larger as they proceed from the center toward the sides the progressive movement of arm 3 will increase the resistance in the corresponding circuit, while leaving the other circuit without resistance.

Fig. 3 shows another way of arranging the resistances which may be more desirable than Fig. 2. In this case the resistances are arranged in parallel, as shown at R R, and when arm 3 is moved to one side or the other the number of resistances placed in parallel in the circuit on that side is progressively increased, thus reducing the actual resistance on that side, while on the other side it remains unchanged. This arrangement can be reversed, so that the movement of arm 3 will disconnect resistances, and thus increase the resistance of one in the circuits. I prefer the arrangement shown in Fig. 1, because all the resistance is placed in series and is transferred from one circuit to the other by the movement of arm 3, thus effecting a greater variation in the strength of the two currents than can be obtained by the same amount of resistance if arranged as in either of the other figures.

In cases where the construction of the controller is such that it cannot move with sufficient freedom through the first step to be moved by the torque of armature D when no current flows through the coil wound upon it and which is connected with the wires 13 and 14 a second coil *a* can be provided on the armature D, and through this the field-currents can be passed after they have reached the junction 10, as is shown in Fig. 4, the current passing through wire *c* to *a* and leaving the latter through wire 11ª, which corresponds to wire 11 of Fig. 1.

*Safety-switch.*—In Fig. 1 it will be noticed that if the current-supply through wire 2 fails the controller-mover B becomes inactive and that if either one of the circuits 6 or 7 becomes interrupted while a current flows in 2 D will be carried around to the position that sets the motor in motion. In cases of this kind it is evident that the most desirable thing to do is to open the circuit through the motor, so that it cannot be used until the defect is repaired. To accomplish this result, I make use of magnetically-operated switches that are controlled by the currents flowing in the circuits of wires 2 6 7. The arrangement of these switches is shown in Fig. 6, in which three switches are shown, each one being actuated by the current flowing in one circuit. The magnet acts to keep the circuit closed and the spring 83 or some other opposing force—as, for example, gravity—acts to pull it open. If the circuit through 2 should be ruptured, the magnet of 82 would become deënergized and the switch would be pulled open, thus breaking the circuit in wire 14, which, as shown in Fig. 1, leads the current to the armature of the motor. If circuit 6 is ruptured, the magnet of 81 will be deënergized and this switch will be pulled up and open the circuit in 14, while a rupture in 7 will operate switch 80 with the same effect. When the main switch S is open, the magnet-switches are all open; but as soon as S is closed the current passes through 2 to 6 and 7 and thus energizes all the magnet-switches and closes the circuit through 14, so that when the operating-switch E is moved the current can pass to the motor-armature. I thus introduce into one of the principal controlling-circuits electromagnetic devices controlling said circuit and bring such electromagnetic devices each under the control of one of the circuits of the controller-mover, the balance or certain specific imbalance in which is relied upon to determine the position of the controller, so that if the balance or imbalance created by the operating-switch is disturbed the motor under control is rendered inoperative.

*Modifications of controller-mover.*—In Figs. 1, 4, and 6, B is shown as consisting of a ring-shaped field-magnet with a shuttle-formed armature; but it can be seen at once from Fig. 5 that D can be wound with the coils 8 8 and 9 9 and thus become the field, while the ring can in like manner be wound to act as the armature. It can also be seen that either the ring or D can be made stationary, so that the controller can be connected with either one providing this one is movable, so that it may impart motion to the controller. It will also be seen that it is not necessary to make the outer member in the form of a ring. In fact, any of the many designs used for electric motors can be used for the controller-mover B. If only two coils 8 8 and two coils 9 9 are used, the apparatus will belong to the bipolar type, since the field will have only two poles. A multipolar construction can be made by increasing the number of 8 8 and 9 9 coils in precisely the same way as is done in motor designs. The wires 13 14, connecting the coil on D with the circuit, are shown as if rigidly connected; but it will be understood that as D rotates through a considerable angle the current is transmitted to its coil or coils either through sliding contacts or flexible cables.

The design of controller C shown in Fig. 1 is only diagrammatic and has been used, as it shows the various circuit connections clearly, but as my invention does not relate to the construction of the controller I claim it in connection with any form of controller that will perform the required functions. While I have shown a specific arrangement of circuits in the motor-field and armature, I do not confine myself to the use of this particular arrangement, but claim the method of moving the controller by means of the mover B and the switch E broadly in connection with any arrangement of motor-circuits.

*Moving plurality of controllers.*—It will be seen at once that the controller-mover B can be made to move two or more controllers at the same time by having these strung one after the other on the same shaft or by connecting with each one by means of suitable gearing. Hence I do not confine myself to the use of a single controller, but claim, broadly, the operation of one or any number of controllers and motors by means of the controller-mover B. It will further be seen from Fig. 8 that the circuits 6 and 7 can be divided into any number of branches and that in each branch a controller-mover can be connected. Thus with a single operating-switch E any number of controller-movers B D can be operated. An arrangement of this kind would be required in the operation of a train of cars when two or more cars are provided with motors, and the first-named arrangement of operating two or more controllers with one controller-mover would be required for each car if it carried two or more motors connected in independent circuits. Therefore I do not restrict myself to the use of a single controller-mover, but I claim, broadly, the operation of one or any number of controller-movers by means of a single operating-switch.

As shown in Fig. 8, one switch E is connected so as to operate a number of controller-movers. As will be noticed, switches $t$ are provided in all the wires 6 and in all the wires 7, so that any of the controller-movers B may be cut out, if desired, but all can be operated at the same time, as is indicated in the drawing.

*Plurality of operating-switches.*—It is also evident from Fig. 7 that the circuit-wires 6 and 7 can be branched off and run to two or more operating-switches E, and there are many cases where such an arrangement is required—as, for example, in elevators that are operated from the various floors as well as from the car. Therefore I do not limit myself to the use of a single operating-switch, but claim, broadly, the use of any number of operating-switches connected in parallel with each other between the wire 2 and the wires 6 and 7 whether said wires 6 and 7 lead to a single motor-mover or to several.

By having a number of operating-switches placed in different positions and arranged with necessary switches, by means of which any one may be connected with the wires 2, 6, and 7, if there are, say, four points A B C D from which it is necessary to operate the motor at different times the operator can go to any one of these points and by closing the switches that connect the switch E at that point with the circuits 2 6 7 be able to operate the controller-mover providing all the other switches E are disconnected.

Referring again to Fig. 7, while the wire 2 is permanently connected with the arm 3 of all the switches small switches $t$ are inserted in all the wires 6 and 7, so as to operate the controller-mover B from any one of the switches E. Such a one is connected by closing its switches $t$, and all the other switches E are disconnected by opening their switches $t$. In the figure the center switch E is shown active and the others are inactive.

As has already been stated, the controller-mover B can be made in a variety of forms—for instance, as shown in Fig. 5. In this construction the field-magnet takes the part of the movable member D and is wound with a coil connected in the main circuit by the wires 13 and 14. The armature performs the function of the ring in Fig. 1 and is wound with two coils 8 and 9, which are the equivalents of the same numbered coils in Fig. 1. In Fig. 1, as well as in Fig. 6, the coils 8 and 9 are shown at right angles to each other, but they can be at a greater or at a smaller angle. If the angle is reduced, the resultant magnetic flux will be greater, but the angle through which it can be deflected by variations in the currents through coils 8 and 9 will be reduced. If the angle is increased, the resultant magnetic flux will be reduced, but the angle through which it can be deflected will be increased. The angle at which the coils will be placed in any particular case will depend upon the conditions to be fulfilled.

*Operating plurality of switches instead of controller.*—It is common practice at the present time to use a number of switches to perform the functions of the controller C. Thus a reversing-switch may be used to stop and start and reverse the motor, and another switch may be used to cut out the resistance in the armature-circuit and make any other circuit connections used for varying the speed. Instead of using two switches a number may be used, one for running in one direction and one for running in the opposite direction and one for each change in the circuit connections required to produce the various speeds. These several switches can be operated mechanically or by means of electromagnets. The latter arrangement is the one most commonly used, and Fig. 9 illustrates the way in which the controller C in Fig. 1 would act to operate a number of electromagnetic switches. In this figure, $s$ $s$ represent a reversing-switch, which is moved so as to connect the motor for one direction of rotation by means of the electromagnet L, and by means of the electromagnet R it is connected so as to run in the opposite direction. The magnet $m$ acts to cut the resistance 32 out of the armature-circuit and magnet $n$ cuts out resistance 33, while magnet $p$ acts to cut out a portion of the shunt field-coils. The magnets are of the solenoid type and the connectors $g$, $h$, and $i$ are insulated. As will be seen, the movement of the lever 25 of the controller C makes and breaks the circuits through the several electromagnets.

If the switches shown in Fig. 9 were operated mechanically, the movable parts of all of them would be actuated by the movable part of the controller B, which could be accomplished by any suitable mechanism for imparting the motion of B to the movable parts of the switches.

The construction of the switches in Fig. 9 and the means employed to move such switches mechanically by means of the controller-mover B form no essential part of my invention. Therefore they need not be more fully illustrated or explained herein. The main feature of my invention is the means whereby the controller C may be caused to move positively step by step from a point which is more or less distant or, in other words, whereby the controller is moved step by step without the application of manual force either directly to the movable part of the controller or through mechanical motion-transmission devices of any kind.

As can be readily seen, the movement of the armature D of the controller-mover can be utilized to impart motion to any kind of controller, whether electrical, hydraulic, mechanical, or otherwise, or to any device that it may be desired to move through definite distances or over a certain distance with a definite speed. For example, D can be connected with a valve that controls the flow of a liquid or gas through pipes, and by moving the lever 3 of E to different positions the valve will be opened or closed to definite positions. If it is desired to open or close the valve gradually, making the entire range of movement in a certain definite time, the result can be accomplished by providing the switch E with numerous contacts, so that the variation of current strength in the coils 8 and 9 may be made practically a graduating one, and thus the movement of the valve will become practically a uniform progression, although, speaking in strict accuracy, it will consist of a series of very short movements. Inasmuch as the movement of the armature D can be utilized in various ways, as explained in the foregoing, I do not restrict myself to its use in connection with motor-controllers only, but claim its use for any purpose where it is desired to produce a definite form of motion at a distant point, whether such motion consists of a step-by-step progression or of a uniform advance or retrogression.

Having thus described my invention, what I claim as new therein, and desire to secure by Letters Patent, is—

1. As a means for developing from a distant point defined movements in the controller of an electric circuit, the combination of an electromagnetic controller-mover comprising two relatively movable members, one of which acts as a field and has a plurality of magnetizing-coils connected in parallel circuits and developing magnetic fluxes in angularly-different directions, conductors for supplying current to said parallel circuits independently and means for differentiating from the distant point the current supplied to these circuits; the other member being wound with coils that develop magnetic flux in a single direction, connected in parallel with the two parallel circuits of the field and in series with the circuit through the controller; and circuit connections connecting the parallel field-circuits in parallel with the circuit which the controller controls.

2. In combination with an electric controller, a controller-mover having a magnetic field formed of a plurality of coils connected in parallel circuits which form a closed loop and producing magnetic fluxes at an angle with each other, said loop being connected in a circuit in parallel relation with the circuit that is being controlled, and means for varying the current supplied to the respective coils; an armature provided with coils connected in series with the circuit through the controller and being arranged to be opened and closed when the circuit that is controlled is opened and closed, thereby shutting off the current through the armature-coils when the controller is turned to the inactive position.

3. In combination with an electric controller, means for actuating said controller from a number of distant points which consist in a controller-mover mechanically connected with the controller, comprising two elements coöperating to produce relative movement between them, one acting as a field and having a plurality of magnetizing-coils exerting their magnetizing efforts in lines at an angle with each other, and connected in parallel with the main circuit; the other element acting as an armature and having coils connected in series with the main circuit; connections between one of the terminals of each field-circuit and one side of the main circuit, connections between the other ends of these circuits and the several distant points, means at these distant points for connecting these connections with the other side of the main circuit whereby the field-circuits may be closed through any one of the distant points, and means at these points for differentiating the current flowing through the two parallel field-circuits from these distant points.

4. In an electromagnetic device through which to develop a determined movement of a current-controlling switch from a distant point, the combination of a circuit-closer at the distant point, an electromagnetic mover consisting of two members, one of which develops a magnetic field and the other of which acts as an armature, a circuit connecting the coils of the armature in series with the main line, so that it receives the main-line current that passes through the current-controlling switch, independent circuits connecting the different coils of the field with the conductors of the main line on opposite sides of the current-controlling switch and bringing the said coils of the field in parallel with the main line and in series with the circuit-closer, and a rheostat, the sections of which are in circuit with the parallel field-circuits and are introduced into one of said field-circuits and cut out of the other by the action of said circuit-closer, for the purpose set forth.

5. In an electromagnetic controller-mover, the combination of a main line, an armature having its coils connected in series with the main line, a field wound with coils connected in parallel circuits leading to a distant point, said coils developing magnetic fluxes in different magnetic circuits at an angle to each other, an operating-switch connected with both the parallel circuits of the field-coils, a resistance introduced in said parallel circuits so as to be cut in or out of either of the field-coil circuits, by said operating-switch, and vary the magnetizing force of said coils and the angular position of the resultant magnetic flux of their combined field of force without opening the circuits or changing the direction of the current.

6. In an electromagnetic controller-mover, the combination of a main line, an armature having its coils connected in series with the main line, a field wound with coils connected in parallel circuits leading to a distant point, said coils developing magnetic fluxes in different magnetic circuits at an angle to each other, an operating-switch connected with both the parallel circuits of the field-coils, a resistance introduced in said parallel circuits so as to be cut in or out of either of the field-coil circuits, by said operating-switch, and vary the magnetizing force of said coils and the angular position of the resultant magnetic flux of their combind field of force and circuit connections between the ends of the parallel coil-circuits and the opposite sides of the main line, whereby the field and operating-switch are connected in parallel with the main circuit.

7. The combination of a main circuit, a controller, for said main circuit, a controller-mover comprising an armature and a field, the armature having its coils connected in series in said main circuit, and in parallel relation with the field-coils of the controller-mover; said field wound with coils connected in parallel circuits leading to a distant point, said coils developing magnetic fluxes in different magnetic circuits at an angle with each other, an operating-switch connected with the parallel field-circuits, a resistance introduced in said parallel circuits so as to be cut in or out of either of them by said operating-switch, and vary the magnetizing force of said coils and thereby the angular position of the resultant magnetic field, and circuit connections between the ends of the parallel field-coil circuits and the opposite sides of the main circuit whereby the field and the operating-switch are connected in parallel relation with the main circuit, and the circuit connections of the field-coils are not disturbed when the circuit through the armature is interrupted.

8. The combination of an electric supply-circuit, a controller introduced therein, an armature mechanically connected with the moving part of said controller, and having its winding introduced in series in the supply-circuit, and therefore, under control of the controller, a field in inductive relation to said armature, and having a plurality of windings exerting magnetic influence in different lines at an angle to each other, parallel circuits connecting the respective field-windings in parallel with the supply-circuit whereby said field is normally excited, and the resistance and operating-switch introduced in said parallel circuits, an auxiliary winding on the armature also in shunt with the supply-circuit whereby the armature is initially excited until it moves the controller sufficiently to close the circuit.

9. In combination with a main supply-circuit and a motor-controller, an electrically-actuated controller-mover having an element introduced in series in the circuit to be controlled, and also an auxiliary winding on said element introduced in said circuit in parallel, and a suitable operating-switch for said controller-mover.

10. In combination with an electric controller, means for actuating said controller from a distance comprising a controller-mover B having a movable member D magnetized by coils connected in series with the main circuit, imparting its movement to the controller, and a stationary member magnetized by a plurality of coils acting to develop magnetic fluxes in different directions, said coils being connected in parallel circuits forming branches of a circuit derived from the main circuit, and in parallel relation to the armature-circuit, an actuating-switch E for varying the strength of the current flowing through the two field-coil circuits of said controller, the switch E being located at a point distant from the controller, suitable electrical connections between the controller-mover and the switch, and between the switch and the main circuit, and mechanical connections between the armature of D and the controller whereby movement may be developed in the movable member of D by the movement of E at the distant point and said movement be imparted to the controller.

11. In combination with a controller-mover having a plurality of magnetizing-coils for the purpose set forth, and parallel circuits through which said coils are independently excited, and an armature with coils in series with the main circuit, and through which current is cut on or off by the movement of the controller; the herein-described operating-switch E constructed with resistances connected with its several contacts, and graduated to correspond to the differentiations in magnetic flux required to change the angular position of the resultant field in concordance with changes in the angular position of the switch E whereby the movement of E over the contacts, from step to step, produces a corresponding movement of the controller-mover from step to step, and circuit connections whereby said parallel circuits and coils and operating-switch are connected in parallel with the controller and are not affected by the movements of the controller.

12. In combination with an electric circuit having a translating device therein, such as an electric motor, and a controller in said circuit constructed to cut the translating device in and out and to graduate its speed; the herein-described controller-mover controlled in part by an electric circuit in parallel relation to the controller-circuit, and uninfluenced by any movement of the controller, and in part by a circuit in series with the controller and thereby controlled by the movements of the controller, said controller-mover being movable step by step to different positions and having mechanical connections through which it imparts its motion to the controller substantially as described.

13. In combination with a main electrical circuit, a conductor 2 leading from one of the wires thereof, the switch-arm 3 connected with said conductor 2, a resistance divided in sections which are connected with contacts over which said switch-arm moves to cut resistance in and out of circuits, conductors 6, 7, connected with said resistance, the controller-mover B having coils 8, 9, connected respectively with the wires 6, 7, and developing separate magnetic fluxes in lines at an angle to each other, a suitably-excited armature D with its coils connected in series in the main circuit and under the influence of said magnetic fluxes, the conductor 11, 12, leading from the coils 8, 9, to the other wire of the main circuit, and a controller having mechanical connection through which it is moved from the armature D.

14. In combination with a supply-circuit, a motor in said circuit, and a controller for said motor; the controller-mover, the operating-switch electrically connected with controller-mover, and electromagnetic cut-outs introduced in the motor-circuit and controlled by the circuits of the operating-switch, for the purpose set forth.

15. As a means for actuating from a distant point the controller of a heavy working current of electricity, the combination of the controller-mover comprising a field of force embodying the plurality of coils developing magnetic fluxes at an angle to each other, and the rotating member having a winding connected in series with said plurality of coils, and a controlling-switch having a plurality of contacts connected by independent conductors with the respective coils of the armature of the controller-mover; the operating-switch and controller-mover being connected in parallel with the circuit of the main current to be controlled.

16. As a means for actuating from a distant point the controller of a heavy working current of electricity, the combination of the controller-mover comprising a magnetic field provided with a plurality of coils developing magnetic fluxes at an angle to each other, and the rotating member having a winding connected in series with said plurality of coils, and therefore traversed by all the current flowing through both field-circuits, and with an additional coil connected in series with the main circuit, and a controlling-switch having a plurality of contacts connected by independent conductors with the respective coils of the field of the controller-mover; the operating-switch and the field of the controller-mover being connected in parallel with the circuit of the main current to be controlled.

17. As a means for actuating from a distant point the controller for a heavy working current of electricity, the combination of a controller-mover comprising a field of force formed by a plurality of coils developing magnetic fluxes at angles one to another and an armature having a main winding receiving current which passes through said field-coils and an initially-energizing winding conducted in a circuit parallel to the field-circuit, and an actuating-switch having a plurality of contacts connected through independent conductors with the respective coils of said field.

18. The combination of a main circuit, a controller-mover such as herein described, an operating-switch, connecting-lines 2, 6, 7, connecting the operating-switch with the main line and with the controller-mover, magnetically-actuated cut-out switches placed in the main circuit, conductors connecting the magnet-coils of said switches, each one separately, in series with one of the connecting-lines 2, 6, 7, and acting when traversed by current, to keep the switches closed, and when the circuit through either of them is interrupted to open a switch, and thus open the main circuit.

19. The combination of a main line, a controller-mover, a controller, an operating-switch such as herein described, the circuit connections 2, 6, 7, thereof, magnetically-actuated switches introduced in series in the circuit through the controller and conductors connecting the actuating-magnets of said magnetically-actuated switches in series each one separately, with one of the circuit-lines 2, 6 or 7, of the controller-mover; the magnets acting each one to hold its respective switch closed when traversed by current and permitting the switch to open when the current through the magnet is interrupted, whereby any interruption of the current in any part of the controller-mover field will result in opening its corresponding cut-out switch and thereby opening the main circuit.

20. The combination of a main line, a controller, a controller-mover, an operating-switch, circuits substantially as herein described, connecting the operating-switch with the main line and with the controller-mover field, switches introduced in series in and controlling the main circuit, a separate magnet actuating each switch, conductors connecting each of said magnets in series with one of the circuits, including the controller-mover, the operating-switch and the main line, whereby the interruption of the current in any one of said conductors will deënergize its corresponding switch-magnet, and when the magnet is deënergized, by stoppage of the current in any part of the controller-mover field-circuit the corresponding cut-out switch will open the main circuit.

The foregoing specification signed this 22d day of April, 1901.

WILLIAM BAXTER, JR.

In presence of—
 THOMAS W. PHAIR,
 STEPHEN H. OLIN.